US012812413B2

(12) United States Patent
Zhu et al.

(10) Patent No.: US 12,812,413 B2
(45) Date of Patent: Nov. 24, 2026

(54) ADAPTIVE OPTIMIZATION METHOD AND APPARATUS FOR 5G WEIGHT VALUE, COMPUTING DEVICE, AND COMPUTER STORAGE MEDIUM

(71) Applicants: CHINA MOBILE GROUP DESIGN INSTITUTE CO., LTD., Beijing (CN); CHINA MOBILE COMMUNICATIONS GROUP CO., LTD., Beijing (CN)

(72) Inventors: Wentao Zhu, Beijing (CN); Feng Gao, Beijing (CN); Wenzhi Li, Beijing (CN); Xidian Wang, Beijing (CN); Yuan Wu, Beijing (CN); Chenxi Zhang, Beijing (CN); Fei Liu, Beijing (CN); Kankan Jin, Beijing (CN); Jinpeng Xu, Beijing (CN); Minghao Gao, Beijing (CN); Shimeng Wang, Beijing (CN); Yonghong Zhao, Beijing (CN); Yu Qiu, Beijing (CN); Jiajia Hao, Beijing (CN)

(73) Assignees: China Mobile Group Design Institute Co., LTD., Beijing (CN); China Mobile Communications Group Co., LTD., Beijing (CN)

( * ) Notice: Subject to any disclaimer, the term of this patent is extended or adjusted under 35 U.S.C. 154(b) by 377 days.

(21) Appl. No.: 18/708,978

(22) PCT Filed: Nov. 3, 2022

(86) PCT No.: PCT/CN2022/129509

§ 371 (c)(1),
(2) Date: May 9, 2024

(87) PCT Pub. No.: WO2023/083088

PCT Pub. Date: May 19, 2023

(65) Prior Publication Data

US 2025/0008348 A1 Jan. 2, 2025

(30) Foreign Application Priority Data

Nov. 11, 2021 (CN) ......................... 202111335448.5

(51) Int. Cl.
*H04W 24/02* (2009.01)
*H04B 17/309* (2015.01)
(Continued)

(52) U.S. Cl.
CPC .......... *H04W 24/02* (2013.01); *H04B 17/328* (2023.05); *H04B 17/347* (2023.05); *H04W 24/10* (2013.01)

(58) Field of Classification Search
None
See application file for complete search history.

(56) References Cited

U.S. PATENT DOCUMENTS

| | | | | |
|---|---|---|---|---|
| 2016/0192157 A1* | 6/2016 | Wirola | .................. | H04W 4/029 455/456.1 |
| 2016/0371985 A1* | 12/2016 | Kotecha | ............... | G01C 21/005 |

(Continued)

FOREIGN PATENT DOCUMENTS

| | | |
|---|---|---|
| CN | 108271171 A | 7/2018 |
| CN | 111343648 A | 6/2020 |

(Continued)

OTHER PUBLICATIONS

International Search Report corresponding to PCT Application No. PCT/CN2022/129509, mailed Jan. 10, 2023. (Chinese and English language document). (12 pages).

*Primary Examiner* — Otis L Thompson, Jr.
(74) *Attorney, Agent, or Firm* — Maginot, Moore & Beck, LLP

(57) ABSTRACT

An adaptive optimization method for a 5G weight value includes: mapping 5G MR sample points to grid elements of a 3D grid; identifying a type of each grid element; deter- (Continued)

mining a weight value combination; determining a first coverage value based on a first path loss for a center grid element of the business distribution center grid cluster and each weight value combination, determining a first coverage improvement value based on the first coverage value, determining from the weight value combination an initial weight value combination; determining a second coverage value for a weak depth coverage grid element based on a second path loss and each initial weight value combination, determining a second coverage improvement value based on the second coverage value, and determining, from the initial weight value combination, a final weight value combination.

20 Claims, 5 Drawing Sheets

(51) Int. Cl.

| | |
|---|---|
| ***H04B 17/318*** | (2015.01) |
| ***H04W 24/10*** | (2009.01) |

(56) References Cited

U.S. PATENT DOCUMENTS

| | | | | |
|---|---|---|---|---|
| 2018/0004207 | A1* | 1/2018 | Michini | B64C 39/024 |
| 2018/0007654 | A1* | 1/2018 | Wirola | G01S 5/02521 |
| 2019/0174337 | A1* | 6/2019 | Prasad | H04B 7/0639 |
| 2020/0059959 | A1* | 2/2020 | Turtinen | H04W 74/006 |
| 2020/0357190 | A1* | 11/2020 | Reid | G06T 19/20 |
| 2022/0179033 | A1* | 6/2022 | Cui | G01S 5/0036 |
| 2022/0210781 | A1* | 6/2022 | Farag | H04B 7/06952 |
| 2023/0110349 | A1* | 4/2023 | Siomina | G01S 5/0009 370/252 |
| 2023/0388196 | A1* | 11/2023 | Mozaffari | H04L 41/16 |
| 2025/0005856 | A1* | 1/2025 | Qiu | G06T 17/00 |

FOREIGN PATENT DOCUMENTS

| | | | |
|---|---|---|---|
| CN | 113015192 | A | 6/2021 |
| CN | 113131974 | A | 7/2021 |
| WO | 2020135450 | A1 | 7/2020 |

* cited by examiner

Schematic diagram of vertical plane

Schematic diagram of horizontal plane

ADAPTIVE OPTIMIZATION METHOD AND APPARATUS FOR 5G WEIGHT VALUE, COMPUTING DEVICE, AND COMPUTER STORAGE MEDIUM

CROSS REFERENCE TO RELATED APPLICATIONS

This application is a continuation application of International Application No. PCT/CN2022/129509 filed on Nov. 3, 2022, which claims priority to Chinese patent application No. 202111335448.5, filed on Nov. 11, 2021, the entire contents of which are incorporated herein by references.

TECHNICAL FIELD

The disclosure relates to a field of communication technologies, in particular to an adaptive optimization method of a 5G weight value, a related device, a related computing device and a related computer storage medium.

BACKGROUND

There are multiple 5th Generation (5G) mobile communication technology weight value optimization schemes for the vertical scenario mainly. For example, a building is directly divided into layers by a floor height based on a three-dimensional (3D) high-precision map and simulation optimization is directly performed in combination with a 5G beam scene of an equipment manufacturer. Or, a distribution of 5G cells is simulated through 4G Minimization Drive Test (MDT) data, where 4G building cell information is obtained from the MDT data of 4G cells.

SUMMARY

According to a first aspect of embodiments of the disclosure, an adaptive optimization method for a 5G weight value is provided. The method includes:

establishing, by a processor, a three-dimensional (3D) grid, and mapping 5G measurement report (MR) sample points to grid elements of the 3D grid;

identifying a type of each grid element by the processor, in which the type includes a business grid element type or a weak depth coverage grid element type;

determining, by the processor, a business distribution center grid cluster based on business grid elements, and determining a first path loss between a center grid element of the business distribution center grid cluster and a cell grid element;

determining a weight value combination by the processor based on a center point of the business distribution center grid cluster, determining a first coverage value for the center grid element of the business distribution center grid cluster based on the first path loss and each weight value combination, determining a first coverage improvement value based on the first coverage value, and determining an initial weight value combination from the weight value combination, in which the first coverage improvement value corresponding to the initial weight value combination is greater than a preset threshold; and determining a second coverage value for a weak depth coverage grid element based on a second path loss between the weak depth coverage grid element and the cell grid element and each initial weight value combination, determining a second coverage improvement value based on the second coverage value, and determining, from the initial weight value combination, a final weight value combination, in which the second coverage improvement value corresponding to the final weight value weight is greater than 0.

According to a second aspect of embodiments of the disclosure, an electronic device is provided. The electronic device includes: a processor, a memory, a communication interface and a communication bus. The processor, the memory and the communication interface communicate with each other via the communication bus.

The memory is configured to store at least one executable instruction, the executable instruction can cause the processor to:

establish a three-dimensional (3D) grid, and mapping 5G measurement report (MR) sample points to grid elements of the 3D grid;

identify a type of each grid element by the processor, in which the type includes a business grid element type or a weak depth coverage grid element type;

determine a business distribution center grid cluster based on business grid elements, and determine a first path loss between a center grid element of the business distribution center grid cluster and a cell grid element;

determine a weight value combination based on a center point of the business distribution center grid cluster, determine a first coverage value for the center grid element of the business distribution center grid cluster based on the first path loss and each weight value combination, determine a first coverage improvement value based on the first coverage value, and determine an initial weight value combination from the weight value combination, in which the first coverage improvement value corresponding to the initial weight value combination is greater than a preset threshold; and determine a second coverage value for a weak depth coverage grid element based on a second path loss between the weak depth coverage grid element and the cell grid element and each initial weight value combination, determine a second coverage improvement value based on the second coverage value, and determine, from the initial weight value combination, a final weight value combination, in which the second coverage improvement value corresponding to the final weight value weight is greater than 0.

According to a third aspect of embodiments of the disclosure, a non-transitory computer-readable storage medium having at least one executable instruction stored thereon is provided. The executable instruction is configured to cause a processor to perform the above adaptive optimization method for a 5G weight value, the method including:

establishing, by a processor, a three-dimensional (3D) grid, and mapping 5G measurement report (MR) sample points to grid elements of the 3D grid;

identifying a type of each grid element by the processor, in which the type includes a business grid element type or a weak depth coverage grid element type;

determining, by the processor, a business distribution center grid cluster based on business grid elements, and determining a first path loss between a center grid element of the business distribution center grid cluster and a cell grid element;

determining a weight value combination by the processor based on a center point of the business distribution center grid cluster, determining a first coverage value for the center grid element of the business distribution center grid cluster based on the first path loss and each weight value combination, determining a first coverage improvement value based on the first coverage value, and determining an initial weight value combination from the weight value combination, in which the first coverage improvement value corresponding to the initial weight value combination is greater than a preset threshold; and determining a second coverage value for a weak depth coverage grid element based on a second path loss between the weak depth coverage grid element and the cell grid element and each initial weight value combination, determining a second coverage improvement value based on the second coverage value, and determining, from the initial weight value combination, a final weight value combination, in which the second coverage improvement value corresponding to the final weight value weight is greater than 0 . . .

BRIEF DESCRIPTION OF THE DRAWINGS

Various other advantages and benefits will become clear to those skilled in the art by reading the detailed description of the preferred implementations below. The accompanying drawings are used solely for the purpose of illustrating the preferred implementations and are not considered as limiting embodiments of the disclosure. Moreover, throughout the accompanying drawings, the same reference symbols are used to represent the same components.

DETAILED DESCRIPTION

Embodiments of the disclosure will be described in greater detail below with reference to the accompanying drawings. Although embodiments of the disclosure are shown in the accompanying drawings, it is understandable that the disclosure may be implemented in various forms without being limited by embodiments set forth herein. Instead, these embodiments are provided to enable a more thorough understanding of the disclosure and to fully convey the scope of the disclosure to those skilled in the art.

Depth coverage optimization of a wireless signal in a vertical high-rise scenario has always been a difficult problem existing in network optimization. Existing 5th Generation (5G) mobile communication technology weight value optimization schemes for the vertical scenario mainly include the following. A building is directly divided into layers by a floor height based on a three-dimensional (3D) high-precision map and simulation optimization is directly performed in combination with a 5G beam scene of an equipment manufacturer. Or, a distribution of 5G cells is simulated through 4G Minimization Drive Test (MDT) data, where 4G building cell information is obtained from the MDT data of 4G cells. For example, the MDT data contains latitude and longitude information, which can be combined with a 3D high-precision electronic map to geographically present the building coverage situation of the 4G wireless signal, automatically identify the 4G building cell information, and position 5G building coverage cells by analyzing a co-station coverage situation of 4G/5G cell. Based on a distance between the 5G cell and its covered building, a building height, and basic antenna and feed information of 5G cells, 5G vertical wave width suitable for the building coverage can be calculated through algorithms.

However, when performing the 5G weight value optimization for the vertical scenario, calculation only involves the building height and horizontal position information of the 4G MDT data, and it is difficult to accurately identify vertical dimension information, which reduces the evaluation accuracy of the coverage of 5G wireless signal.

In view of the above problem, embodiments of the disclosure provide an adaptive optimization method for a 5G weight value, a related apparatus, a related computing device and a related computer storage medium, to overcome the above problem or at least partially solve the above problem.

Embodiment 1

Figure 1:
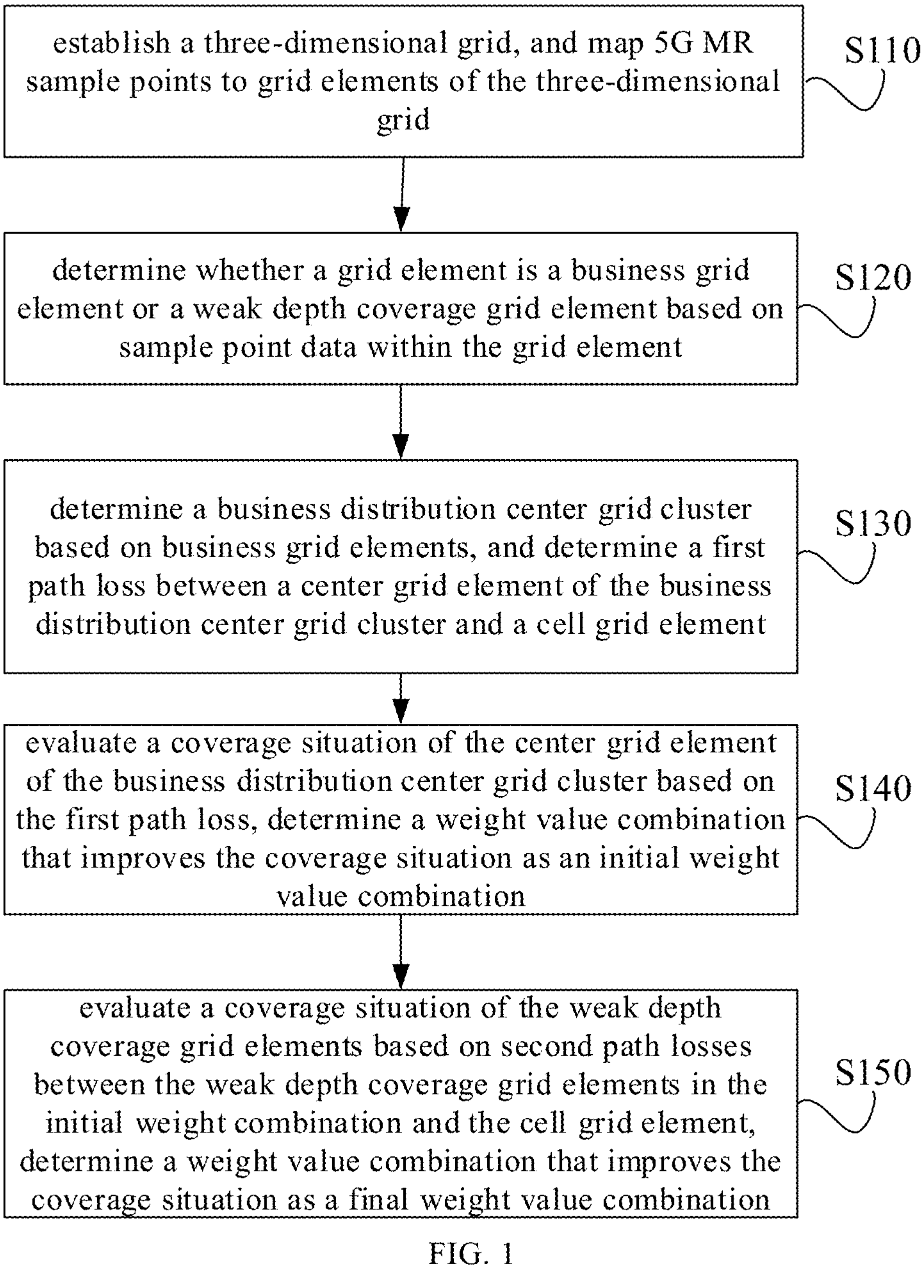
FIG. 1 is a flowchart illustrating an adaptive optimization method for a 5G weight value according to an embodiment of the disclosure.

FIG. 1 is a flowchart illustrating an adaptive optimization method for a 5th Generation Mobile Communication Technology (5G) weight value according to an embodiment of the disclosure. As illustrated in FIG. 1, the method includes the following.

At block S110, a three-dimensional (3D) grid is established, and 5G Measurement Report (MR) sample points are mapped to grid elements contained in the 3D grid.

For example, World Geodetic System 1984 (WGS84) may be adopted to establish a 3D grid having a size of 10 meters (m)×10 m×10 m. A respective exact position of each grid element is represented by three parameters of a center point of this element, i.e., longitude X, latitude Y and height H. The WGS84 is a coordinate system established for the use of the Global Positioning System (GPS).

After establishing the 3D grid, an association between the 5G MR sample points and the 3D grid may be generated, i.e., the 5G MR sample points are mapped to the grid elements of the 3D grid. For example, the 5G MR sample points may be positioned in combination with working parameter data of the base station to obtain their latitudes, longitudes and heights. The 5G MR sample point data carries a Vertical Direction Of Arrival (VDOA) relative to an antenna, which is like the downtilt angle from the sample point to the antenna, a Horizontal Direction Of Arrival (HDOA) relative to the antenna, which is like the azimuthal angle from the sample point to the normal direction of the antenna, and a distance (TA) from the antenna. In combination with an antenna latitude, an antenna longitude, an antenna height and an antenna azimuth (also called as "total azimuth" and the term "antenna azimuth" and the term "antenna total azimuth" may be interchangeably used), a respective latitude, a respective longitude (with reference to FIG. 3) and a respective height (with reference to FIG. 2) of each 5G MR sample point may be obtained. Each 5G MR sample point is mapped to the 3D grid based on its longitude, latitude, and height. Table 1 shows an example of 5G MR sample points.

TABLE 1

| MR identifier | Cell identifier | SSRSRP | Distance (TA) | horizontal angle of arrival (HDOA) | vertical angle of arrival (VDOA) |
|---|---|---|---|---|---|
| 559364495198130176__ xx_100043 | xx | −93 | 604 | −56 | −12 |
| 559364495198130176__ xx_100132 | xx | −85 | 616 | −58 | 0 |
| 559364495198130176__ xx_96140 | xx | −80 | 240 | −36 | −20 |
| 559364495198130176__ xx_96188 | xx | −88 | 384 | 44 | −14 |

In Table 1, the synchronization signal reference signal received power (SSRSRP) is an average of a power of the synchronization signal at each carrier.

Figure 2:
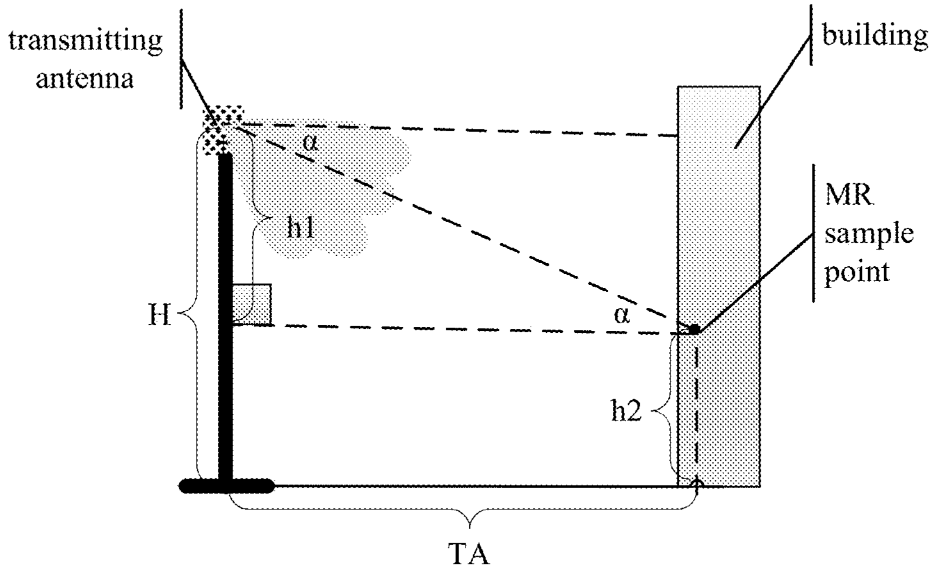
FIG. 2 is a schematic diagram illustrating a vertical plane used in the adaptive optimization method for a 5G weight value according to an embodiment of the disclosure.

The method for obtaining the height of a sample point is illustrated in FIG. 2. Assuming that the VDOA is α, the antenna height is H, and a distance from the sample point to the antenna is TA, the height h2 of the sample point is obtained by equation (1) and equation (2).

$$h1 = TA \cdot \tan\alpha \tag{1}$$

$$h2 = H - h1 \tag{2}$$

Figure 3:
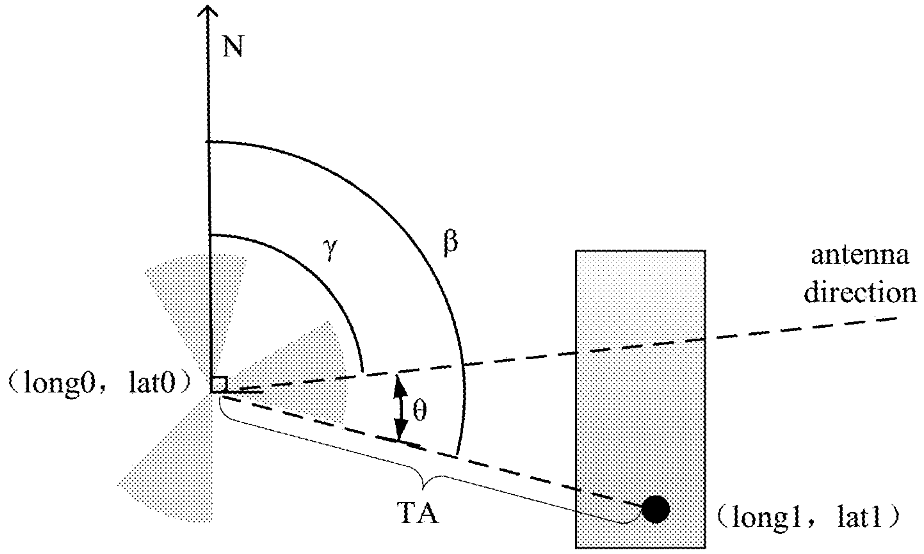
FIG. 3 is a schematic diagram illustrating a horizontal plane used in the adaptive optimization method for a 5G weight value according to an embodiment of the disclosure.

The method for obtaining the latitude and longitude of a sample point is illustrated in FIG. 3. Assuming that a total antenna azimuth is γ, the HDOA is θ, and the antenna latitude and antenna longitude are represented by (long0, lat0), the latitude and longitude (long1, lat1) of the sample point are obtained by equation (3), equation (4) and equation (5).

$$\beta = \gamma + \theta \tag{3}$$

$$\text{long1} = \text{long0} + \frac{TA \cdot \sin\beta}{C1 \cdot \cos\left(\text{lat0} \cdot \frac{\pi}{180}\right)} \tag{4}$$

$$\text{lat1} = \text{lat0} + \frac{TA \cdot \cos\beta}{C2} \tag{5}$$

in which, C1 and C2 are constants related to the radius of the earth. Generally, C1=111320 and C2=110540. The 3D coordinates (x, y, z) of each 5G MR sample point may be obtained by using a following latitude coordinate conversion equation (6), a following longitude coordinate conversion equation (7) and a following equation (8):

$$x = \text{long1} * 20037508.34/180; \tag{6}$$

$$y = \ln\left(\tan\left(\frac{90 + \text{lat1}}{2}\right)\right) * 20037508.34/180; \tag{7}$$

$$z = h2. \tag{8}$$

At block S120, it is identified, based on sample point data within each grid element, whether a respective grid element is a business grid element or a weak depth coverage grid element.

The weak depth coverage grid element is defined as a grid element within which the number of sample points is greater than a preset threshold (e.g., 80) and an average Reference Signal Receiving Power (RSRP) is less than a first preset threshold (e.g., −105 dBm). The weak depth coverage grid element may also be defined as a grid element within which the RSRP is less than a preset second threshold (e.g., −110 dBm) and a ratio of the number of sample points is greater than a preset percentage (e.g., 20%).

For example, a total number of sample points, an average RSRP, and a ratio of the number weak depth coverage (RSRP less than −105 dBm) sample points within each grid element are calculated through the 5G MR sample points. For example, during the calculation, the following judgements may be made. When the number of sample points in the $i^{th}$ grid element is greater than 80, the following equation (9) is directly used to determine its average RSRP:

$$\overline{RSRP^i} = \frac{\sum_j RSRP_j}{J} \tag{9}$$

in which, $RSRP_j$ represents the RSRP of the $j^{th}$ 5G MR sample point within in the $i^{th}$ grid element, and J is a total number of 5G MR sample points within the $i^{th}$ grid element. When $\overline{RSRP^i}$<−105 dBm, the value is recorded as $$\overline{RSRP^i_{weak}}$$

and the $i^{th}$ grid element is put into a dataset $D_{weak}$ of weak depth coverage grid elements for subsequent processing. When $\overline{RSRP^i}$ is greater than or equal to −105 dBm, the value is recorded as $$\overline{RSRP^i_{business}}$$

and the $i^{th}$ grid element is put into a dataset $D_{business}$ of business grid elements for subsequent processing.

In addition, when the number of sample points in the $i^{th}$ grid element is less than or equal to 80, the sample points in the $i^{th}$ grid element are sorted in an ascending order of their RSRPs. All the sample points whose RSRP is less than −110 dBm are selected, and a ratio of the number of these sample points whose RSRP is less than −110 dBm to the number of the sample points within the $i^{th}$ grid element is calculated. When the ratio is greater than 20%, it means that the grid element is a weak depth coverage grid element, and then a calculation by equation (9) is performed on only these 20% of sample points to obtain $$\overline{RSRP}^{i}_{weak}$$

and the $i^{th}$ grid element is put into the dataset $D_{weak}$. When the ratio of the number of the sample points whose RSRP is less than −110 dBm to the number of the sample points within the $i^{th}$ grid element is less than 20%, the calculation by equation (9) is carried out to obtain $$\overline{RSRP}^{i}_{business}$$

and the $i^{th}$ grid element is put into the dataset $D_{business}$.

At block S130, a business distribution center grid cluster is determined based on business grid elements, and a first path loss between a center grid element of the business distribution center grid cluster and a cell grid is determined.

The 5G MR sample points have been associated with the 3D grid through the above blocks. Based on the respective quality and the respective number of 5G MR sample points within each grid element of the 3D grid, the business grids and the poor depth coverage grid elements (i.e., weak depth coverage grid elements) may be identified, the RSRPs of the MR sample points are averaged separately per grid element, and the averaged RSRP is used as the RSRP of the grid element. After identifying the grid elements to determine a respective type of each grid element, the business distribution center grid cluster is determined based on the business grid elements.

For example, the business grid elements are sorted based on the number of sample points. That is, the number of sample points is used as a criterion for judging a business value of each business grid element. The business value (also called as "value" and the term "business value" and the term "value" may be interchangeably used) of each business grid element is expressed as:

$$\alpha_{hi} = \frac{num_{hi}}{numall_h},$$

in which h denotes a cell, i denotes a business grid element, $numall_h$ denotes the number of sample points included in the cell h, and $num_{hi}$ denotes the number of sample points contained in a business grid element i of the cell h. Starting from a business grid element having the highest business value, the business grid elements are added in a descending order of their business values to form a stereoscopic graph. Respective business values of all business grid elements within the stereoscopic graph are summed until the summed business value within the stereoscopic graph accounts for more than 80% of the total business value of the service cell, and then the convergence is achieved and the method is ended to create a high-value business distribution stereoscopic graph, i.e., the business distribution center grid cluster. The center of this stereoscopic graph is the center grid element of the business distribution center grid cluster. The path loss in a vertical scenario is calculated by actual RSRPs of the grid elements in the vertical scenario. After that, assuming that the default path loss remains unchanged, the center grid element of the business distribution center grid cluster is determined by taking the position of the cell as a starting point. The path loss between the cell grid element and this center grid element is calculated as the default path loss for business distribution center beam optimization.

In some embodiments, determining the business distribution center grid cluster based on the business grid elements may be achieved in the following manner. The corresponding business grid elements are added to a set of business grid elements in turn in an ascending order of their business values until the sum of the business values of all business grid elements in the set of business grid elements is greater than a first preset threshold, and the current set of business grid elements is determined as the business distribution center grid cluster.

One Implementable Algorithm is Provided as Follows.

At step 1, for the set $D_{business}$ composed of business grid elements, a respective business value a of each grid element included in the set $D_{business}$ is calculated, and all the grid elements are sorted in an ascending order of their business values $\alpha$, and serial numbers of these grid elements are $n_{business}$.

At step 2, the grid element with the smallest serial number in the set $D_{business}$ is added to the set $C_{business}$ and removed from the set $D_{business}$ at the same time.

At step 3, the sum $\Sigma\alpha$ of values a of all objects in the set $C_{business}$ is calculated, and it is determined whether $\Sigma\alpha$ is greater than 0.8.

At step 4, the step2 to the step3 are repeated until $\Sigma\alpha>0.8$, and the set of business gird elements $C_{business}$, i.e. the business distribution center grid cluster, is output.

At step 5, a business area center point, i.e., a center point of the business distribution center grid cluster, is extracted, and a grid element containing the business area center point is determined as the center grid element of the business distribution center grid cluster, which is shown in equation (10):

$$\text{Location}_{center} = \{(\overline{x_i}, \overline{y_i}, \overline{z_i}) | (x_i, y_i, z_i) \in C_{business}\}. \tag{10}$$

At step 6, the RSRP of the business area center point is recorded as $$\overline{RSRP}^{c}_{business}$$

(derived through equation (9)), and the first path loss is calculated based on $$\overline{RSRP}^{c}_{business}.$$

Regarding the step 6, for example, according to the Friesian transmission equation in the antenna theory, equation (11) is provided as follows:

$$P_r = P_t \frac{G_t G_r \lambda^2}{(4\pi R)^2} \tag{11}$$

in which, $P_r$ represents a received power, Pt represents a transmit power, Gt represents a gain at the transmitter side, $G_r$ represents a gain at the receiver side, A represents a wavelength of the transmitted electromagnetic wave, and R represents a distance between the transmitter side and the receiver side. Through the logarithm on both sides of the equation (11) (converted to dB), equation (12) is provided as follows:

$$\log\frac{P_r}{G_r} = \log P_t + \log G_t - \log\frac{(4\pi R)^2}{\lambda^2} \tag{12}$$

Therefore, for a certain link, the path loss L may be simplified as shown in equation (13):

$$L = P + G - RSRP \tag{13}$$

in which, RSRP represents a measured value of the RSRP of grid element, P represents the transmit power, and G represents an antenna gain (which may be read from the 3D antenna gain pattern (which is a 3D antenna gain direction map)). As a result, the path loss $L_c$ of the current center grid element may be obtained from the average $$RSRP(\overline{RSRP}^{c}_{business})$$

of the center grid element and the 3D antenna gain pattern. Similarly, respective path losses $$L^{i}_{weak}$$

may be calculated for $n_{weak}$ weak coverage grid elements in set $D_{business}$ of weak depth coverage grids based on the antenna gain G corresponding to current matched weight values and respective average RSRP values of the weak depth coverage grid elements (as shown in equation (9)), in which $i \in \{1, \ldots, n_{weak}\}$. When the clustering calculation is performed due to a large number of weak depth coverage grid elements (e.g., the number of the weak depth coverage grid elements is greater than 100), a respective path loss $$\hat{L}^{i}_{weak}$$

of each center grid element of each weak depth coverage grid cluster is calculated for the set $\{C_{weak}\}$, in which $i \in \{1, \ldots, C\}$, where C represents the number of clusters in the set $\{C_{weak}\}$.

At block S140, a coverage situation of the center grid element of the business distribution center grid cluster is evaluated based on the first path loss to determine an initiate weight value combination that improves the coverage situation.

In some embodiments, the weight value combination includes at least one of a weight value for an electron azimuth, a weight value for an electron downtilt angle, a weight value for a horizontal wave width or a weight value for a vertical wave width.

For example, a plurality of weight value combinations may be set based on the first path loss. Each of the plurality of weight value combinations may be adopted to evaluate the coverage situation of the center grid element of the business distribution center grid cluster. All weight value combinations that improve the coverage situation of the center grid element of the business distribution center grid cluster are screened out as initial weight value combinations. That is, there may be one or multiple initial weight value combinations.

At block S150, respective second path losses between the weak depth coverage grid elements and the cell grid element are determined, a coverage situation of the weak depth coverage grid elements is evaluated based on the one or more initial weight value combinations, and a final weight value combination that improves the coverage situation is obtained from the one or more initial weight value combinations.

For example, a respective second path loss between each weak depth coverage grid element and the cell grid element is determined at first. The coverage situation of the weak depth coverage grid elements is evaluated based on the initial weight value combinations and the respective second path losses. All weight value combinations that improve the coverage situation of the weak depth coverage grid elements are screened out as optimal weight value combinations (also called final weight value combinations). That is, there may be one or more final weight value combinations.

For example, embodiments of the disclosure are applicable to a case where there are fewer weak depth coverage grid elements and a distribution of the weak depth coverage grid elements is scattered. Although the coverage evaluation of all the weak depth coverage grid elements will consume a certain amount of computational and time resources, it will provide a more fine-grained evaluation of the weak coverage enhancement effect of the initial weight value combination (s).

By taking that the initial weight value combinations is in a form of set and the final weight value combinations is in a form of set as an example to explain the coverage evaluation of all the under-depth-coverage grid elements, for each of the set of initial weight value combinations {W}, a respective average RSRP is obtained for each of the $n_{weak}$ weak depth coverage grid elements through equation (9). A respective path loss $$L^{i}_{weak}$$

is obtained for each weak depth coverage grid element through equation (13). An antenna gain corresponding to a current initial weight value combination is determined and a respective RSRP value $$(RSRP^{i}_{new})$$

of each weak depth coverage grid element under the current initial weight value combination is calculated through equation (18). A coverage enhancement value $\overline{RSRP}^k$ of all the $n_{weak}$ weak depth coverage grid elements under the initial weight value combination is calculated through equation (9). All the weight value combinations corresponding to the $\overline{RSRP}^k$ that is less than 0 are discarded, and the remaining weight value combinations in {W} are sorted in a descending order of their $\overline{RSRP}^k$ to obtain the final weight value combinations {$\hat{W}$}.

If the final weight value combinations {$\hat{W}$} is not empty, one of the final weight value combinations may be directly used as a final output. Generally, the first one $\hat{W}^1$ in the final weight value combinations {$\hat{W}$} is output as the final output, which is a weight value combination that improves the coverage of the center grid element of the business distribution center grid cluster ($RSRP^{new}$–RSRP>3 dbm) and has the best enhancement effect on the weak depth coverage grid elements (corresponding to the largest $\overline{RSRP}^k$).

In the related art, when performing 5G weight value optimization for a vertical scenario, simulation optimization is performed directly based on a 3D high-precision map in combination with a 5G beam scenario of the equipment manufacturer, which relies only on simulation and building information, without real user information. Therefore, it is unable to establish a feedback mechanism, and may only be used as a kind of initialization scheme for wireless network, i.e., the adjustment may be made only once, which reduces the evaluation accuracy of the 5G wireless signal coverage situation. In another solution, the calculation of 5G vertical wave width adapted for building coverage is based on the building height and the horizontal position information of the 4G MDT data, without 5G user information. Therefore, it is different to identify the vertical dimension information under the vertical scenario by relying only on the user's horizontal position information in the 4G MDT data to position the 5G coverage cells, which is equivalent to using 2D data to optimize the coverage problem in 3D space. As a result, it reduces the evaluation accuracy of the 5G wireless signal coverage situation.

Embodiments of the disclosure provide an adaptive optimization method of 5G weight value applied to the vertical scenario. Vertical dimension information in the cell-level 5G MR data (i.e., the MR data corresponds to a cell) is used to establish the 3D grid. Through clustering analysis of problematic grid elements, user distribution in the vertical scenario is positioned and the coverage problem of the vertical scenario is determined, so as to output an adaptive 5G weight value scheme. Through the calculated path loss for the business center grid element and the path loss for the weak depth coverage grid element, the weight value combination that may simultaneously improve the coverage situation of the business area and the coverage situation of the weak coverage area is filtered out, to achieve the optimization of the 5G vertical coverage scenario, thereby improving the 5G resident ratio, user perception and other indicators, and improving the accuracy of the 5G weight optimization method.

Embodiments of the disclosure may automatically identify the business grid elements and the weak depth coverage grid elements while generating the 5G MR 3D grid, and may use the current antenna transmit power and the 3D antenna gain pattern to simultaneously evaluate the coverage effect of the weight value combination on the business grid elements and the weak depth coverage grid elements, so as to select the optimal weight value combination(s), thereby improving the evaluation accuracy of the 5G wireless signal coverage. The above calculation can cover all the default weight value combinations.

In some embodiments, the block S140 may include the following.

At block S1401, a theoretical weight value combination is obtained based on a business area center point.

The business area center point may be determined by reference to the above step 5. The theoretical weight value combination may be a quadruple group of theoretical weight values including an electron azimuth, an electron downtilt angle, a horizontal wave width and a vertical wave width. For example, the quadruple group of theoretical weight values may be calculated based on the center point ($\bar{x}$h, $\bar{y}$h, $\bar{z}$h) of the business grid element.

To calculate the electron azimuth, an angle between y-axis (i.e., the due north direction) and a line segment formed by a projected point of the coordinate ($x_h$, $y_h$, $z_h$) of the cell h on a x-y plane at z=0 and another projected point of the coordinate ($\bar{x}_h$, $\bar{y}_h$, $\bar{z}_h$) of the business center point on the x-y plane at z=0 is obtained, i.e., a polar coordinate angle $angle_{total}$ of the line segment formed by a point ($x_h$, $y_h$) and a point ($\bar{x}_h$, $\bar{y}_h$) is obtained. Firstly, the horizontal distance between two points is calculated as shown in equation (14):

$$\Delta D = \sqrt[2]{(x_h - \bar{x}_h)^2 - (y_h - \bar{y}_h)^2}. \quad (14)$$

The angle between this line segment and the north direction can be obtained as shown in equation (15):

$$angle_{total} = \sin^{-1}\frac{\bar{x}_h - x_h}{\Delta D}. \quad (15)$$

The calculated $angle_{total}$ is a total azimuth at this time. Based on the known mechanical downtilt angle azimuth, the theoretical electronic azimuth is obtained, i.e., $eazimuth_{ideal} = angle_{total} - azimuth$.

To calculate the electron downtilt angle, the height difference between the coordinate ($x_h$, $y_h$, $z_h$) of the cell h and the coordinate ($x_h$, $y_h$, $z_h$) of the business center point is calculated firstly as shown in equation (16):

$$\Delta H = z_h - \bar{z}_h. \quad (16)$$

The horizontal distance between the two points is calculated through equation (14) and then the theoretical electron downtilt angle is obtained as shown in equation (17):

$$etilt_{ideal} = \tan^{-1}\frac{\Delta H}{\Delta D} - \text{tilt} \quad (17)$$

in which, tilt represents the mechanical downtilt angle of the cell h.

To calculate the horizontal wave width, from the business distribution center grid cluster set $C_{business}$, all the points that are in the same plane as the business center ($x_h$, $y_h$, $z_h$) are found out, i.e., the set $$\{C_{business}^{\bar{z}_h}\}$$

of business points that are all on the plane $\bar{z}_h$ is obtained. For each point in the set $$\{C_{business}^{\bar{z}_h}\},$$

an angle between the y-axis (i.e., the due north direction) and a line connecting the point and the coordinate $(x_h, y_h, z_h)$ of the cell is obtained through equation (15). A maximum angle $angle_{max}$ and a minimum angle $angle_{min}$ are obtained from respective angles obtained for all points. The total azimuth $angle_{total}$ between the cell and business grid center is calculated through equation (15). A larger value is selected from $2*(angle_{max}-angle_{total})$ and $2*(angle_{total}-angle_{min})$, as an ideal output horizontal wave width $hbw_{ideal}$.

To calculate the vertical wave width, a lowest grid element $(\overline{x}_h, \overline{y}_h, 0)$ and a highest grid element $(\overline{x}_h, \overline{y}_h, \overline{Z}_{max})$ in the vertical direction corresponding to the business center of the business distribution center grid cluster $C_{business}$ are obtained. Through equation (16) and equation (17), the downtilt angle $etilt_{max}$ of the lowest grid element relative to the coordinate $(x_h, y_h, z_h)$ of the cell h and the downtilt angle $etilt_{min}$ of the highest grid element relative to the coordinate $(x_h, y_h, z_h)$ of the cell h are calculated. Similarly, the larger one among $2*(etilt_{max}-etilt_{ideal})$ and $2*(etilt_{ideal}-etilt_{min})$ is selected as an ideal output horizontal wave width $vbw_{ideal}$.

At block S1402, the theoretical weight value combination is mapped into a weight value combination actually supported by the equipment manufacturer based on a default 5G weight value table of the equipment manufacturer.

For example, the default 5G weight value table of the equipment manufacturers is shown in Table 2 below.

TABLE 2

| NR | | | | | |
|---|---|---|---|---|---|
| scenario type | | horizontal wave width | vertical wave width | adjustment range for downtilt angle | adjustment arrange for azimuth |
| default0 | H105V6 | 105° | 6° | −2~13 | 0 |
| S1 | H110V6 | 110° | 6° | −2~13 | 0 |
| S2 | H90V6 | 90° | 6° | −2~13 | −10~10 |
| S3 | H65V6 | 65° | 6° | −2~13 | −22~22 |
| S4 | H45V6 | 45° | 6° | −2~13 | −32~32 |
| S5 | H25V6 | 25° | 6° | −2~13 | −42~42 |
| S6 | H110V12 | 110° | 12° | 0~9 | 0 |
| S7 | H90V12 | 90° | 12° | 0~9 | −10~10 |
| S8 | H65V12 | 65° | 12° | 0~9 | −22~22 |
| S9 | H45V12 | 45° | 12° | 0~9 | −32~32 |
| S10 | H25V12 | 25° | 12° | 0~9 | −42~42 |
| S11 | H15V12 | 15° | 12° | 0~9 | −47~47 |
| S12 | H110V25 | 110° | 25° | 6 | 0 |
| S13 | H65V25 | 65° | 25° | 6 | −22~22 |
| S14 | H45V25 | 45° | 25° | 6 | −32~32 |
| S15 | H25V25 | 25° | 25° | 6 | −42~42 |
| S16 | H15V25 | 15° | 25° | 6 | −47~47 |

All weight value combinations including the outputted quadruple group of ideal weight values $(eazimuth_{ideal}, etilt_{ideal}, hbw_{ideal}, vbw_{ideal})$ are screened out, to obtain the weight value combinations actually supported by the equipment manufacturer. For example, there are two implementation ways.

In the first way, starting from a default weight value combination that is close to the quadruple group of ideal weight values screened out from the default weight value table, the default weight value table is traversed with a step size of the electron downtilt angle (default $$\Delta_{step}^{etilt} = 3°,$$

and the minimum is) 1° and a step size of the electron azimuth (default $$\Delta_{step}^{etilt} = 5°,$$

and the minimum is) 1°, to find out all the weight value combinations that may satisfy the coverage of quadruple group of ideal weight values $(eazimuth_{ideal}, etilt_{ideal}, hbw_{ideal}, vbW_{ideal})$. Satisfying, by a weight value combination, the coverage of the quadruple group of ideal weight values means that the weight value combination may contain a coverage range of the quadruple group of ideal weight values. As a result, it may ensure that the new weight value combination has good coverage of the existing business distribution area.

In the second way, the default weight value table is traversed thoroughly. When traversing, the step size of the electron downtilt angle (default $$\Delta_{step}^{etilt} = 3°,$$

and the minimum is) 1° and the step size of the electron azimuth (default $$\Delta_{step}^{etilt} = 5°,$$

and the minimum is) 1° are used to find all weight value combinations that enable the ratio of coverage business grid elements to the business grid elements in the set $C_{business}$ to be equal to or greater than 95%, to obtain as many optional weight value combinations as possible to some extent under the premise of ensuring the existing business coverage.

The second way is automatically triggered when the weight value combination calculated through the first way is empty. If the weight value combination calculated through the second way is still empty, the ratio of the coverage business grid elements is reduced by the step size of $$\Delta_{step}^{ratio} = 5\%,$$

the calculation is carried out again and the calculation is stopped until the ratio reaches 75%, and then no further reduction is made.

At block S1403, the coverage situation of the center grid element of the business distribution center grid cluster is evaluated based on an antenna gain and an antenna transmit power corresponding to the supported weight value combination and the first path loss.

In some embodiments, the block S1403 is realized by the following. The RSRP of the center grid element of the business distribution center grid cluster is determined based on the antenna gain and the antenna transmit power corresponding to the supported weight value combination and the first path loss. A coverage enhancement value is determined for the center grid element of the business distribution center grid cluster based on the RSRP of the center grid element of the business distribution center grid cluster. The weight value combination that enhances the coverage situation is determined based on the coverage enhancement value of the center grid element of the business distribution center grid cluster.

Figure 4:
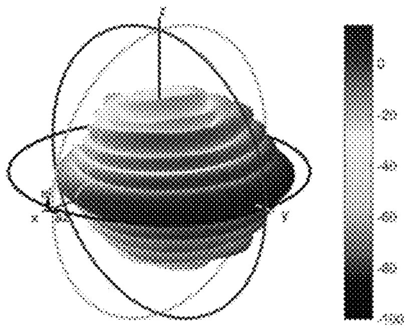
FIG. 4 is a schematic diagram illustrating an antenna gain used in the adaptive optimization method for a 5G weight value according to an embodiment of the disclosure.

For example, for each weight value combination $W^i$ among the supported weight value combinations that are traversed, based on the 3D antenna gain pattern of the default weight value pattern corresponding to this weight value combination, as illustrated in FIG. 4, the configured antenna gain $G^{new}$ for the current weight value combination can be read. By calculating the path loss $L_c$ of the center grid element of the business distribution center grid cluster through equation (13), in combination with the current antenna transmit power $p^{new}$, the RSRP of the current center grid element of the business distribution center grid cluster is calculated through the following equation (18):

$$RSRP^{new} = P^{new} + G^{new} - L_c. \quad (18)$$

When the current $RSRP^{new}$ is larger than a value before adjustment, for example, $RSRP^{new}$−RSRP>3 dbm, i.e., the coverage enhancement value is greater than the preset threshold, it means that the weight value combination can effectively enhance the coverage of the center grid element of the current business distribution center grid cluster. The obtained weight value combination $W^i$ is used as one initial weight value combination, and the initial weight value combinations {W} are output after traversing.

In some embodiments, the block S150 includes the following.

At block S1501, when the number of weak depth coverage grid elements is greater than a second preset threshold and a distribution of the weak depth coverage grid elements is relatively concentrated, a weak depth coverage grid cluster is obtained by clustering the weak depth coverage grid elements.

For example, when the number of weak depth coverage grid elements is greater than a certain value (e.g., the number is greater than 100), the weak depth coverage grid elements are clustered by means of a Density-Based Spatial Clustering of Applications with Noise (DBSCAN) method, thereby improving the efficiency of the subsequent calculations. The implementation algorithm is as follows:

Input: dataset $D_{weak}$ containing $n_{weak}$ weak depth coverage grid elements, where the longitude, the dimension and the height information of a respective center point of each grid element have been transformed into the coordinate ($x_i$, $y_i$, $z_i$) of 3D coordinate system;

Neighborhood radius: ε=30 meters (m);

Density threshold: MinPts=5;

Output: the weak depth coverage grid cluster set $C_{weak}$ after clustering based on density;

Step 1, all weak depth coverage grid elements are marked with "unvisited";

Step 2, when there is a grid element marked with "unvisited", perform the following 1 to 4:

1, randomly selecting an unvisited object p;

2, marking p with "visited";

3, performing the following 3.1 to 3.3 when there are at least MinPts objects in the neighborhood ε of p:

3.1, creating a new cluster C and putting the p into C;

3.2, letting N be a set within the neighborhood ε of p, for each point p' in N:

if the point p' is unvisited, marking p' with "visited"; if there are at least MinPts objects in the neighborhood ε of p', adding those points to the set N; if p' is not yet a member of any cluster, adding p' to C;

3.3, saving C;

4, otherwise, marking p with "noise";

Step 3, outputting the set {$C_{weak}$}.

After obtaining the set {$C_{weak}$}, the same algorithm for positioning the center grid element of the business distribution center grid cluster as described above may be used to position the center grid element $$(\overline{x}^i_{weak}, \overline{y}^i_{weak}, \overline{z}^i_{weak})$$

of each week depth coverage grid cluster. In combination with the $$\overline{RSRP}^i_{weak}$$

computed through equation (9, the second path loss between the center grid element of the weak depth coverage grid cluster and the cell grid is obtained according to $$\overline{RSRP}^i_{weak}.$$

At block S1502, the second path loss between a center grid element of the weak depth coverage grid cluster and the cell grid is determined.

The method for calculating the second path loss in this block is the same as the method for calculating the first path loss, and the relevant content can be found in the relevant description of calculating the first path loss described above, and will not be repeated here.

At block S1503, a coverage situation of the center grid element of the weak depth coverage grid cluster is evaluated based on an antenna gain and an antenna transmit power corresponding to the initial weight value combination and the second path loss.

In some embodiments, the block S1503 may be implemented by the following. A respective RSRP of the center grid element of each weak depth coverage grid cluster is determined based on the antenna gain and the antenna transmit power corresponding to the initial weight value combination and the second path loss. A coverage enhancement value is determined based on respective RSRPs of center grid elements of M weak depth coverage grid clusters. The coverage situation of the center grid elements of the weak depth coverage grid clusters is evaluated based on the coverage enhancement value.

For example, for each weight value combination in the initial weight value combinations {W}, in combination with the respective path loss $$\hat{L}^i_{weak}$$

calculated for the center grid element $$(\overline{x}^i_{weak}, \overline{y}^i_{weak}, \overline{z}^i_{weak})$$

of each weak depth coverage cluster in the weak depth coverage grid cluster set $\{C_{weak}\}$, the respective current RSRP $$\left(RSRP^{i}_{new}\right)$$

of the center grid element of each weak depth coverage cluster is calculated through equation (18). Finally, the RSRP changes before and after adjusting the weight values of the center grid elements of all M weak depth coverage grid clusters are counted according to equation (19):

$$\overline{RSRP}^{k} = \frac{\sum_{M}\left(RSRP^{m}_{new} - \overline{RSRP}^{m}_{weak}\right)}{M} \quad (19)$$

in which, k represents the $k^{th}$ set of initial weight values in the initial weight value combinations {W} (there are K sets of weight values in total), $$\overline{RSRP}^{i}_{weak}$$

represents an average RSRP of the center grid element before the optimization, and $\overline{RSRP}^{k}$ represents an evaluation of an overall improvement situation of this weight value combination on the weak coverage grid set $\{C_{weak}\}$. The initial weight value combinations {W} may also be called a candidate weight value set, and weak depth coverage grid improvement evaluation of all K sets of weight values in the candidate weight value set {W} are performed according to equation (18) and equation (19). All the weight value combinations whose $\overline{RSRP}^{k}$ is less than 0 are discarded, and the rest of the weight value combinations in the initial weight value combinations {W} are sorted in a descending order of the $\overline{RSRP}^{k}$ to obtain the final weight value combinations $\{\hat{W}\}$.

If the final weight value combinations $\{\hat{W}\}$ is not empty, one of the weight value combinations may be directly output as the final output. Generally, the first one $\hat{W}^1$ among the final weight value combinations $\{\hat{W}\}$ is the final output, which is a weight value combination that improves the coverage of the center grid element of the business distribution center grid cluster ($RSRP^{new}$−RSRP>3 dbm) and has the best enhancement effect of the weak depth coverage grids (corresponding to the largest $\overline{RSRP}^{k}$).

Embodiments are applicable to evaluating the coverage of the center grid element of each weak depth coverage grid cluster, i.e., applicable to a case where there are a large number of weak depth coverage grid elements and a distribution of the weak depth coverage grid elements is more centralized, and by only evaluating the coverage of the center grid element of each weak depth coverage grid cluster, the computational consumption can be effectively reduced and computational efficiency can be improved.

In the following, an application of embodiments of the disclosure in a practical application scenario will be described.

Figure 5:
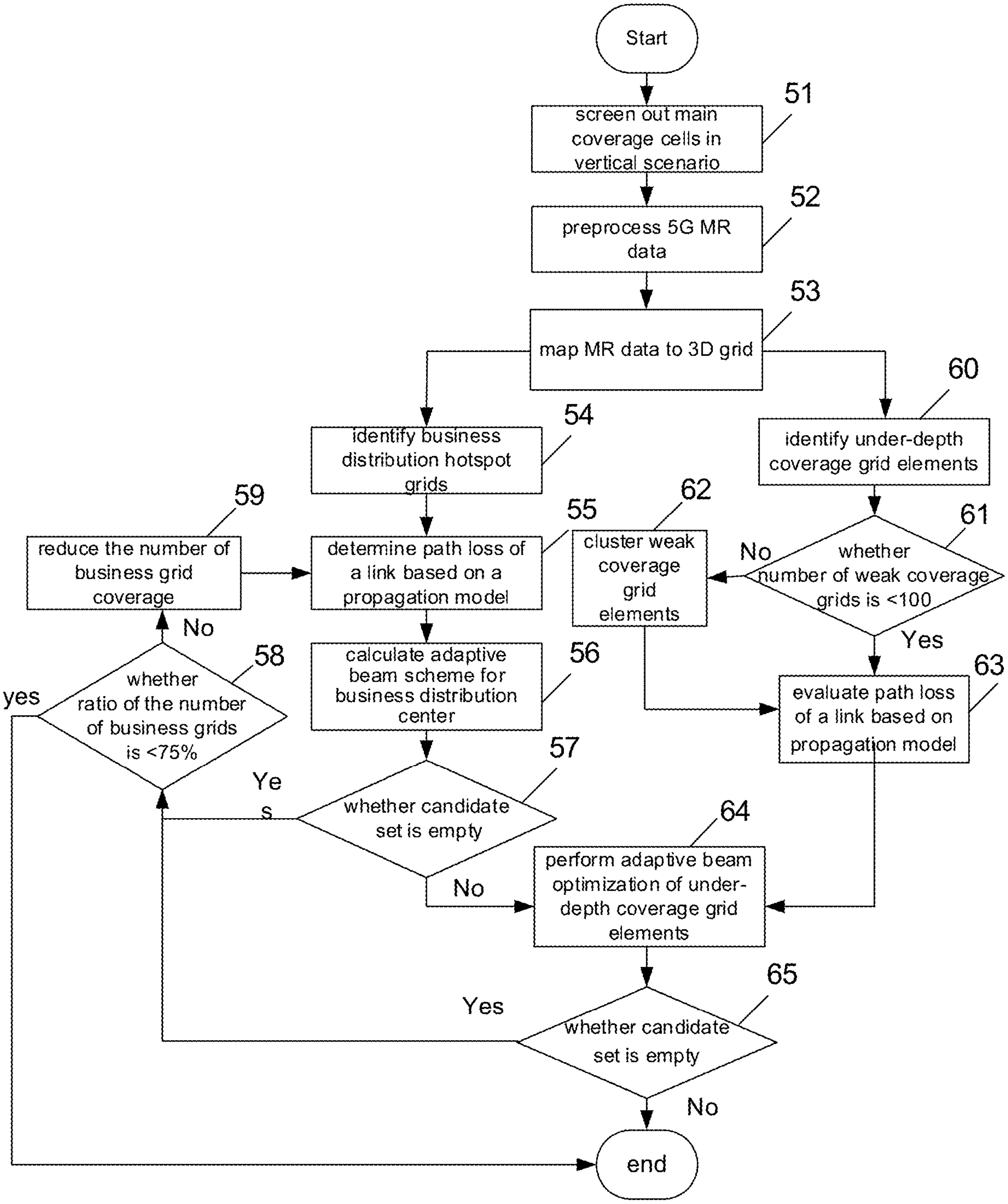
FIG. 5 is another flowchart illustrating an adaptive optimization method for a 5G weight value according to an embodiment of the disclosure.

FIG. 5 is another flowchart illustrating an adaptive optimization method of a 5G weight value according to an embodiment of the disclosure. As illustrated in FIG. 5, the method includes: S51 to S65.

At S51, main coverage cells in the vertical scenario are screened out.

At S52, 5G MR data is preprocessed.

Embodiments of the disclosure position the business area and the weak depth coverage area of the 3D coverage area of the real vertical scenario based on the real 5G MR data of the cell, and using the vertical angle of arrival and TA data.

At S53, MR data is mapped to the 3D grid.

After obtaining the MR data-to-3D grid mapping, S54 and S62 are executed based on the MR data-to-3D grid mapping respectively.

S54, business distribution hotspot grids are identified.

S55, path loss of a link based on a propagation model is determined.

In embodiments of the disclosure, in beam parameter adaptive optimization, the RSRP data from the MR data is used in combination with the propagation model, to evaluate the path loss from the cell to the grid element and prepare for subsequent evaluations of weight value schemes. For example, the propagation model is used for calculating the path loss for the business area and the weak depth coverage area, to evaluate the coverage effect of each candidate weight value set schemes, so as to find out the optimal scheme among them, which improves the accuracy and effectiveness of the coverage effect.

S56, adaptive beam scheme is calculated for business distribution center.

S57, it is determined whether a candidate set is empty.

When the candidate set is empty, S58 is executed. When the candidate set is not empty, S64 is executed.

S58, it is determined whether a ratio of a number of business grid elements is <75%.

When the ratio is less than 75%, the procedure ends. When the ratio is not less than 75%, S59 and S55 are executed in turn.

S59, the number of business grid element coverages is reduced.

S60, under-depth coverage grid elements are identified.

S61, it is determined whether the number of weak coverage grid elements is <100.

When the number is not less than 100, S62, S63 and S64 are executed sequentially. When the number is less than 100, S63 and S64 are executed sequentially.

S62, weak coverage grid elements are clustered.

Embodiments of the disclosure adopt a 3D DBSCAN to cluster the weak coverage grid elements, which reduces the amount of data to be processed by subsequent algorithms and is adapted to the scenario in which there is a large number of weak depth coverage grid elements, and also improves the efficiency of algorithms while ensuring its computational accuracy and realizing the analysis of big data.

S63, path loss of a link based on a propagation model is evaluated.

S64, adaptive beam optimization of under-depth coverage grid elements is performed.

S65, it is determined whether the candidate set is empty.

When the candidate set is empty, S58 is executed. When the candidate set is not empty, the procedure ends.

Embodiment 2

Figure 6:
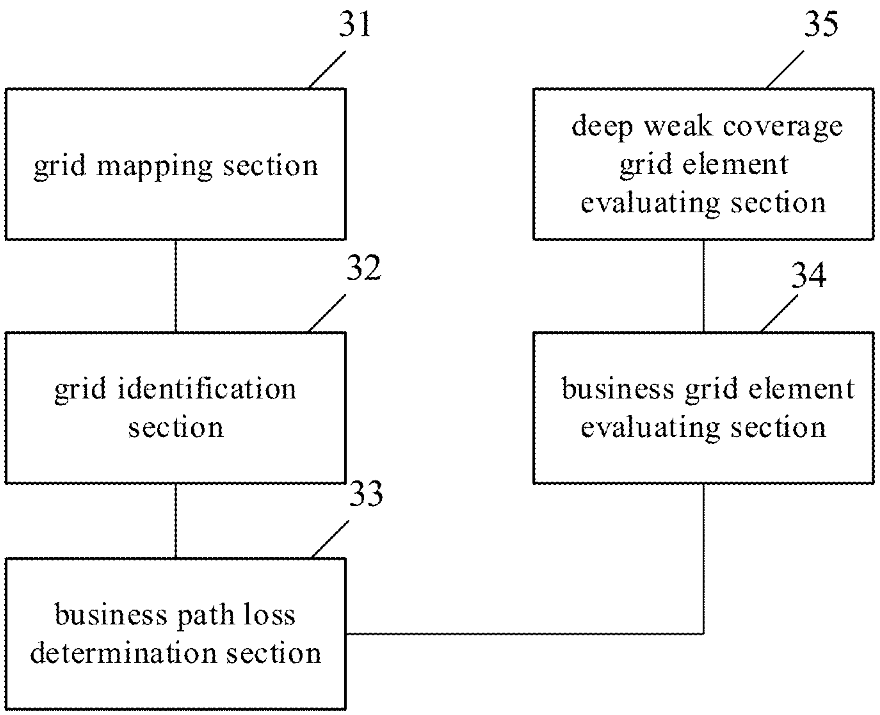
FIG. 6 is a structural diagram illustrating an adaptive optimization apparatus for a 5G weight value according to an embodiment of the disclosure.

FIG. 6 is a structural diagram illustrating an adaptive optimization apparatus for a 5G weight value according to Embodiment 2 of the disclosure. As illustrated in FIG. 6, the apparatus includes: a grid mapping section 31, a grid identification section 32, a business path loss determination section 33, a business grid element evaluating section 34 and a weak depth coverage grid element evaluating section 35.

The grid mapping section 31 is configured to establish a 3D grid, and map 5G MR sample points to grid elements of the 3D grid.

The grid identification section 32 is configured to determine, based on sample point data within a grid element, whether the grid element is a business grid element or a weak depth coverage grid element.

The business path loss determination section 33 is configured to determine a business distribution center grid cluster based on business grid elements and determine a first path loss between a center grid element of the business distribution center grid cluster and a cell grid element.

The business grid element evaluating section 34 is configured to evaluate a coverage situation of the center grid element of the business distribution center grid cluster based on the first path loss, and determine a weight value combination that improves the coverage situation as an initial weight value combination.

The weak depth coverage grid element evaluating section 35 is configured to evaluate a coverage situation of the weak depth coverage grid elements based on second path losses between the weak depth coverage grid elements and the cell grid element, and determine a weight value combination that improves the coverage situation from the initial weight value combination as a final weight value combination.

In some embodiments, the business path loss determination section 33 is further configured to: add business grid elements to a set of business grid elements in a descending order of business values of the business grid elements until a sum of all the business values of the business grid elements in the set of business grid elements is greater than a first preset threshold, and determine the current set of business grid elements as the business distribution center grid cluster.

In some embodiments, the business grid element evaluating section 34 is further configured to: calculate a theoretical weight value combination based on a center point of the business grid element; map the theoretical weight value combination into a weight value combination actually supported by an equipment manufacturer based on a default 5G weight table of the equipment manufacturer; and evaluate the coverage situation of the center grid element of the business distribution center grid cluster based on an antenna gain and an antenna transmit power corresponding to the supported weight value combination and the first path loss.

In some embodiments, the deep weak coverage grid element evaluating section 35 is further configured to: in response to determining that the number of weak depth coverage grid elements is greater than a second preset threshold and a distribution of the week depth coverage grid elements is relatively concentrated, obtain weak depth coverage grid clusters by clustering the weak depth coverage grid elements; determine the second path losses between center grid elements of the weak depth coverage grid clusters and the cell grid element; and evaluate the coverage situation of the center grid elements of the weak depth coverage grid clusters based on an antenna gain and an antenna transmit power corresponding to the initial weight value combination and the second path losses.

In some embodiments, the business grid element evaluating section 34 is further configured to: determine a RSRP of the center grid element of the business distribution center grid cluster based on the antenna gain and the antenna transmit power corresponding to the supported weight value combination and the first path loss; determine an coverage enhancement of center grid element of the business distribution center grid cluster based on the RSRs of the center grid element of the business distribution center grid cluster; and determine a weight value combination that improves the coverage situation based on the coverage enhancement of the center grid element of the business distribution center grid cluster.

In some embodiments, the weak depth coverage grid element evaluating section 35 is further configured to: determine a respective RSRP of the center grid element of each business distribution center grid cluster based on the antenna gain and the antenna transmit power corresponding to the initial weight value combination and a corresponding second path loss; determine an coverage enhancement based on respective RSRPs of center grid elements of M weak depth coverage grid clusters; and evaluate the coverage situation of the center grid elements of the weak depth coverage grid clusters based on the coverage enhancement.

In some embodiments, the weight value combination includes at least one a weight value for an electron azimuth, a weight value for an electron downtilt angle, a weight value for a horizontal wave width, or a weight value for a vertical wave width.

The adaptive optimization apparatus for a 5G weight value according to embodiments of the disclosure is used to perform the adaptive optimization method for a 5G weight value described in above embodiments, and its working principle and technical effects are similar and will not be repeated here.

Embodiment 3

Embodiments of the disclosure provide a non-transitory computer storage medium having at least one executable instruction stored thereon. The computer executable instruction is executed to perform the adaptive optimization method for a 5G weight value according to any of above method embodiments.

Embodiment 4

Figure 7:
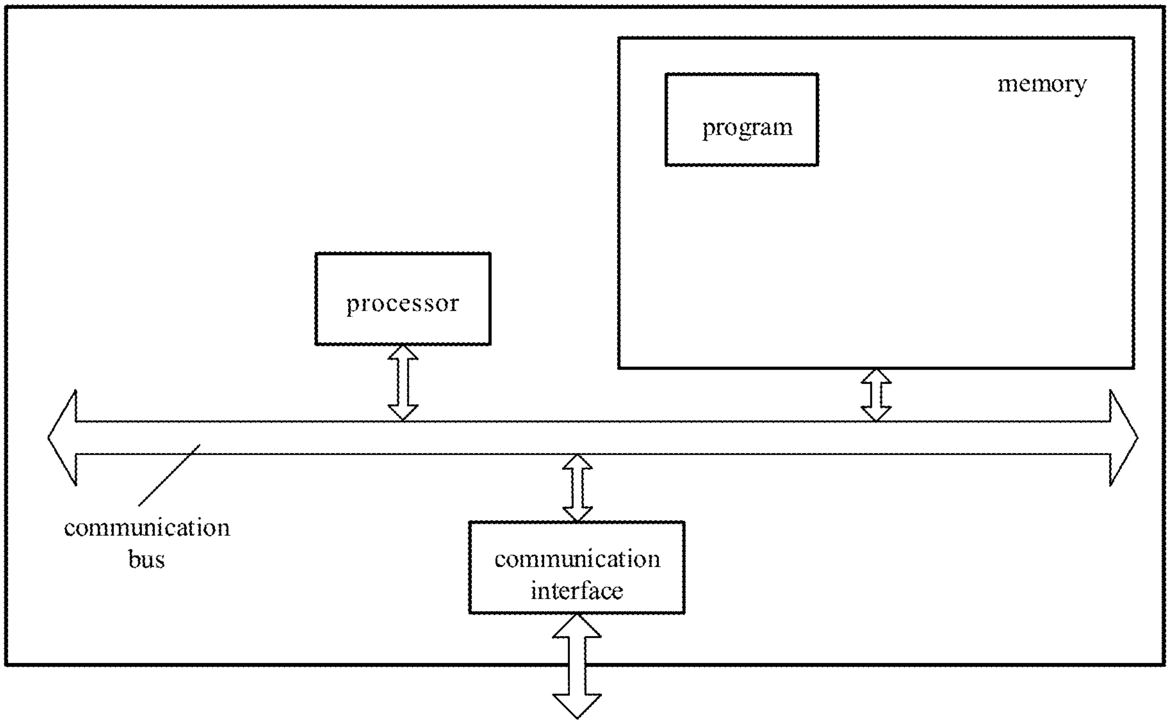
FIG. 7 is a structural diagram illustrating a computing device according to an embodiment of the disclosure.

FIG. 7 is a structural diagram illustrating a computing device according to an embodiment of the disclosure. The specific embodiments of the disclosure do not limit the specific implementations of the computing device.

As illustrated in FIG. 7, the computing device includes: a processor, a memory, a communication interface and a communication bus.

The processor, the memory and the communication interface communicate with each other via the communication bus. The communication interface is configured to communicate with network elements of other devices such as clients or other servers. The processor is configured to execute a program, specifically to perform the relevant steps in the above embodiments of the adaptive optimization method for a 5G weight value performed by the computing devices and the cell azimuth prediction method.

For example, the program may include a program code, which includes a computer operating instruction.

The processor may be a central processing unit (CPU), or an Application Specific Integrated Circuit (ASIC), or one or more integrated circuits configured to implement the embodiments of the disclosure. The one or more processors included in the computing device may be the same type of processor, such as one or more CPUs, or may be different types of processors, such as one or more CPUs and one or more ASICs.

The memory is configured to store programs. The memory may include a high-speed random-access memory (RAM) or may also include a non-volatile memory, such as at least one disk memory.

The procedure may be used to cause the processor to execute the 5G weight adaptive optimization method in any of the above method embodiments. Specific implementations of the steps in the procedure can be found in the descriptions of the corresponding steps and units in the above-described embodiments of the 5G weight adaptive optimization method, and will not be repeated herein. It may be clearly understood by those skilled in the field to which it belongs that, for convenience and conciseness of the description, the specific working process of the above-described devices and portions may be referred to in the description of the corresponding process in the foregoing method embodiment, and will not be repeated herein.

The algorithms displayed or provided herein are not inherently associated with any particular computer, virtual system, or other devices. Various general systems may be used in combination with the illustrations herein. The structures required to construct such systems are apparent in light of the above description. Moreover, the embodiments of the disclosure are not directed to any particular programming language. It should be appreciated that a variety of programming languages may be used to implement the embodiments of the disclosure described herein, and that the above description of the particular language is given to disclose the optimal implementations of the embodiments of the disclosure.

In the specification provided herein, a large number of relevant details are described. However, it can be appreciated that the embodiments of the disclosure can be practiced without these relevant details. In some examples, well-known methods, structures and techniques are not shown in detail, so as not to obscure the understanding of the present specification.

Similarly, it should be understood that, in order to simplify the embodiments of the disclosure and to aid in understanding one or more of various inventive aspects, in the description of the exemplary embodiments of the disclosure above, various features of the embodiments of the disclosure are sometimes grouped together in individual embodiment, figure or description thereof. However, the disclosure should not be construed as reflecting an intent that the embodiments of the disclosure claimed to be protected require more features than those expressly documented in each claim. More precisely, as reflected in the claims below, the inventive aspect lies in fewer than all the features of the individual embodiment disclosed above. Therefore, the claims that follow specific embodiments are thereby expressly incorporated into the specific embodiments, in which each claim itself serves as an individual embodiment of the invention.

It will be appreciated by those skilled in the art that portions of the apparatus in the embodiments may be adaptively altered and set in one or more apparatuses different from the embodiment. It is possible to combine the portions, units or components of the embodiments into a single portion, unit or component. In addition, they can be divided into a plurality of sub-portions, sub-units or sub-components. In addition to the fact that at least some of such features and/or processes or units are mutually exclusive, any combination of all features disclosed in this specification (including accompany claims, abstract and drawings) and all processes or units of any method or apparatus so disclosed may be employed. Unless otherwise expressly stated, each feature disclosed in this specification (including the accompanying claims, abstract, and drawings) may be replaced by an alternative feature that provides the same, equivalent, or similar purpose.

Furthermore, those skilled in the art understand that although some embodiments include some features included in other embodiments and not others, combinations of features of different embodiments mean that different embodiments are formed within the scope of the disclosure. For example, in the following claims, any one of the embodiments claimed for protection may be used in any combination.

Various component embodiments of the disclosure may be implemented in hardware, or in software portions running on one or more processors, or any combination thereof. It should be appreciated by those skilled in the art that microprocessors or digital signal processors (DSPs) may be used in practice to implement some or all of the functions of some or all of the components of the embodiments of the disclosure. The embodiments of the disclosure may also be realized as apparatus or device programs (e.g., computer programs and computer program products) for performing some or all of the methods described herein. Such programs for implementing the embodiments of the disclosure may be stored on a computer-readable medium, or may have one or more signals. Such signals may be obtained by downloading from an Internet site, or may be provided on a carrier signal, or may be provided in any other form.

It should be noted that the above embodiments illustrate rather than limit the embodiments of the disclosure, and those skilled in the art may design alternative embodiments without departing from the scope of the appended claims. In the claims, any reference symbols located between the parentheses should not be constructed as a limitation of the claims. The term "comprises" does not exclude the existence of elements or steps not listed in the claims. The term "α" or "one" before an element does not exclude the existence of a plurality of such elements. The embodiments of the disclosure may be realized with the aid of hardware comprising a number of different elements and with the aid of a suitably programmed computer. In unit claims enumerating a number of devices, several of these devices may be specified by means of the same hardware item. The use of the terms "first", "second", and "third", does not indicate any order. The terms may be interpreted as names. The steps in the above embodiments should not be construed as limiting the order of execution unless specifically stated.

INDUSTRIAL UTILITY

The disclosure provides an adaptive optimization method for a 5G weight value, a related apparatus, a related computing device and a related computer storage medium. The method includes: mapping 5G MR sample points to grid elements of the 3D grid; determining a first oath loss between a center grid element of the business distribution center grid cluster and a cell grid element; evaluating a coverage situation of the center grid element of the business distribution center grid cluster based on the first path loss, determining a weight value combination that improves the coverage situation as the initial weight value combination; and evaluating a coverage situation of the weak depth coverage grid elements based on second path losses between the weak depth coverage grid elements in the initial weight value combination and the cell grid element, determining a weight value combination that improves the coverage situation as a final weight value combination. Embodiments of the disclosure can automatically identify the business grid elements and the weak depth coverage grid elements, and can simultaneously evaluate the coverage effect of the weight value combination on the business grid elements and the weak depth coverage grid elements, so as to select the optimal weight value combination, which improves the evaluation accuracy of the coverage of the 5G wireless signal.

What is claimed is:

1. An adaptive optimization method for a 5th generation (5G) weight value, comprising:

establishing, by a processor, a three-dimensional (3D) grid, and mapping 5G measurement report (MR) sample points to grid elements of the 3D grid;

identifying a type of each grid element by the processor, wherein the type comprises a business grid element type or a weak depth coverage grid element type;

determining, by the processor, a business distribution center grid cluster based on business grid elements, and determining a first path loss between a center grid element of the business distribution center grid cluster and a cell grid element;

determining a weight value combination by the processor based on a center point of the business distribution center grid cluster, determining a first coverage value for the center grid element of the business distribution center grid cluster based on the first path loss and each weight value combination, determining a first coverage improvement value based on the first coverage value, and determining an initial weight value combination from the weight value combination, in which the first coverage improvement value corresponding to the initial weight value combination is greater than a preset threshold; and determining a second coverage value for a weak depth coverage grid element based on a second path losses between the weak depth coverage grid elements and the cell grid element and each initial weight value combination, determining a second coverage improvement value based on the second coverage value, and determining, from the initial weight value combination, a final weight value combination, wherein the second coverage improvement value corresponding to the final weight value weight is greater than 0.

2. The method of claim 1, wherein determining the business distribution center grid cluster based on the business grid elements comprises:

adding business grid elements to a set of business grid elements in a descending order of business values of the business grid elements until a sum of the business values of the business grid elements in the set of business grid elements is greater than a first preset threshold, and determining a current set of business grid elements as the business distribution center grid cluster, wherein the business value of the business grid element is relevant to a number of MR sample points contained in the business grid element.

3. The method of claim 1, wherein determining the weight value combination comprises:

determining a center point of the business distribution center grid cluster;

determining a theoretical weight value combination based on the center point of the business distribution center grid cluster;

mapping the theoretical weight value combination into the weight value combination based on a predetermined 5G weight table, wherein a value of the theoretical weight value combination is within a value range of the weight value combination.

4. The method of claim 1, wherein determining the first coverage value of the center grid element of the business distribution center grid cluster based on the first path loss and each weight value combination comprises:

for each weight value combination, determining a corresponding adjusted antenna gain based on each weight value combination; and determining a reference signal received power (RSRP) of the center grid element of the business distribution center grid cluster based on the adjusted antenna gain, an antenna transmit power and the first path loss; and determining the RSRP as the first coverage value.

5. The method of claim 4, wherein determining the first coverage improvement value based on the first coverage value comprises:

determining an initial RSRP of the center grid element of the business distribution center grid cluster based on RSRPs of 5G sample points contained in the center grid element of the business distribution center grid cluster;

determining a difference between the first coverage value of the center grid element of the business distribution center grid cluster and the initial RSRP; and determining the difference as the first coverage improvement value.

6. The method of claim 1, wherein the weight value combination comprises at least one of a weight value for an electron azimuth, a weight value for an electron downtilt angle, a weight value for a horizontal wave width or a weight value for a vertical wave width.

7. The method of claim 1, further comprising:

in response to determining that a number of weak depth coverage grid elements is greater than a second preset threshold and a distribution density of the weak depth coverage grid elements is greater than a density threshold, obtaining a weak depth coverage grid cluster by clustering the weak depth coverage grid elements; and determining a third path loss between a center grid element of the weak depth coverage grid cluster and the cell grid element;

wherein determining the second coverage value of the weak depth coverage grid element based on a second path loss between the weak depth coverage grid element and the cell grid element and each initial weight value combination, determining the second coverage improvement value based on the second coverage value, and determining, from the initial weight value combination, the final weight value combination comprises:

determining a third coverage value of the center grid element of the weak depth coverage grid cluster based on the third path loss and each initial weight value combination, determining a third coverage improvement value based on the third coverage value, and determining, from the initial weight value combination, a final weight value combination, wherein the third coverage improvement value of the final weight value combination is greater than 0.

8. The method of claim 7, wherein determining the third coverage value of the center grid element of the weak depth coverage grid cluster based on the third path loss and each initial weight value combination comprises:

for each weight value combination, determining a corresponding adjusted antenna gain based on each weight value combination;

determining a reference signal received power (RSRP) of the center grid element of the weak depth coverage grid cluster based on the adjusted antenna gain, an antenna transmit power and the third path loss; and determining the RSRP as the third coverage value.

9. The method of claim 8, wherein determining the third coverage improvement value based on the third coverage value comprises:

determining an initial RSRP of the center grid element of the weak depth coverage grid cluster based on RSRPs of 5G sample points contained in the center grid element of the weak depth coverage grid cluster;

determining a difference between the third coverage value of the center grid element of the weak depth coverage grid cluster and the initial RSRP; and determining the difference as the third coverage improvement value.

10. An electronic device, comprising: a processor, a memory, a communication interface and a communication bus, wherein the processor, the memory and the communication interface communicate with each other via the communication bus; and the memory is configured to store at least one executable instruction, the executable instruction can cause the processor to:

establish a three-dimensional (3D) grid, and mapping 5G measurement report (MR) sample points to grid elements of the 3D grid;

identify a type of each grid element by the processor, wherein the type comprises a business grid element type or a weak depth coverage grid element type;

determine a business distribution center grid cluster based on business grid elements, and determine a first path loss between a center grid element of the business distribution center grid cluster and a cell grid element;

determine a weight value combination by the processor based on a center point of the business distribution center grid cluster, determine a first coverage value for the center grid element of the business distribution center grid cluster based on the first path loss and each weight value combination, determine a first coverage improvement value based on the first coverage value, and determine an initial weight value combination from the weight value combination, wherein the first coverage improvement value corresponding to the initial weight value combination is greater than a preset threshold; and determine a second coverage value for a weak depth coverage grid element based on a second path loss between the weak depth coverage grid element and the cell grid element and each initial weight value combination, determine a second coverage improvement value based on the second coverage value, and determine, from the initial weight value combination, a final weight value combination, wherein the second coverage improvement value corresponding to the final weight value weight is greater than 0.

11. The electronic device of claim 10, wherein the processor is configured to:

add business grid elements to a set of business grid elements in a descending order of business values of the business grid elements until a sum of the business values of the business grid elements in the set of business grid elements is greater than a first preset threshold, and determine a current set of business grid elements as the business distribution center grid cluster, wherein the business value of the business grid element is relevant to a number of MR sample points contained in the business grid element.

12. The electronic device of claim 10, wherein the processor is configured to:

determine a center point of the business distribution center grid cluster;

determine a theoretical weight value combination based on the center point of the business distribution center grid cluster;

map the theoretical weight value combination into the weight value combination based on a predetermined 5G weight table, wherein a value of the theoretical weight value combination is within a value range of the weight value combination.

13. The electronic device of claim 10, wherein the processor is configured to:

for each weight value combination, determine a corresponding adjusted antenna gain based on each weight value combination; and determine a reference signal received power (RSRP) of the center grid element of the business distribution center grid cluster based on the adjusted antenna gain, an antenna transmit power and the first path loss; and determine the RSRP as the first coverage value.

14. The electronic device of claim 13, wherein the processor is configured to:

determine an initial RSRP of the center grid element of the business distribution center grid cluster based on RSRPs of 5G sample points contained in the center grid element of the business distribution center grid cluster;

determine a difference between the first coverage value of the center grid element of the business distribution center grid cluster and the initial RSRP; and determine the difference as the first coverage improvement value.

15. The electronic device of claim 10, wherein the processor is further configured to:

in response to determining that a number of weak depth coverage grid elements is greater than a second preset threshold and a distribution density of the weak depth coverage grid elements is greater than a density threshold, obtain a weak depth coverage grid cluster by clustering the weak depth coverage grid elements; and determine a third path loss between a center grid element of the weak depth coverage grid cluster and the cell grid element; and determine a third coverage value of the center grid element of the weak depth coverage grid cluster based on the third path loss and each initial weight value combination, determine a third coverage improvement value based on the third coverage value, and determine, from the initial weight value combination, a final weight value combination, wherein the third coverage improvement value of the final weight value combination is greater than 0.

16. The electronic device of claim 15, wherein the processor is configured to:

for each weight value combination, determine a corresponding adjusted antenna gain based on each weight value combination; and determine a reference signal received power (RSRP) of the center grid element of the weak depth coverage grid cluster based on the adjusted antenna gain, an antenna transmit power and the third path loss; and determine the RSRP as the third coverage value.

17. The electronic device of claim 16, wherein the processor is configured to:

determine an initial RSRP of the center grid element of the weak depth coverage grid cluster based on RSRPs of 5G sample points contained in the center grid element of the weak depth coverage grid cluster;

determine a difference between the third coverage value of the center grid element of the weak depth coverage grid cluster and the initial RSRP; and determine the difference as the third coverage improvement value.

18. The electronic device of claim 10, wherein the weight value combination comprises at least one of a weight value for an electron azimuth, a weight value for an electron downtilt angle, a weight value for a horizontal wave width or a weight value for a vertical wave width.

19. A non-transitory computer-readable storage medium having at least one executable instruction stored thereon, wherein the executable instruction is configured to cause a processor to perform the adaptive optimization method for a $5^{th}$ generation (5G) weight value, the method comprising:

establishing, by a processor, a three-dimensional (3D) grid, and mapping 5G measurement report (MR) sample points to grid elements of the 3D grid;

identifying a type of each grid element by the processor, wherein the type comprises a business grid element type or a weak depth coverage grid element type;

determining, by the processor, a business distribution center grid cluster based on business grid elements, and determining a first path loss between a center grid element of the business distribution center grid cluster and a cell grid element;

determining a weight value combination by the processor based on a center point of the business distribution center grid cluster, determining a first coverage value for the center grid element of the business distribution center grid cluster based on the first path loss and each weight value combination, determining a first coverage improvement value based on the first coverage value, and determining an initial weight value combination from the weight value combination, in which the first coverage improvement value corresponding to the initial weight value combination is greater than a preset threshold; and determining a second coverage value for a weak depth coverage grid element based on a second path loss between the weak depth coverage grid element and the cell grid element and each initial weight value combination, determining a second coverage improvement value based on the second coverage value, and determining, from the initial weight value combination, a final weight value combination, wherein the second coverage improvement value corresponding to the final weight value weight is greater than 0.

20. The non-transitory computer-readable storage medium of claim 19, wherein determining the business distribution center grid cluster based on the business grid elements comprises:

adding business grid elements to a set of business grid elements in a descending order of business values of the business grid elements until a sum of the business values of the business grid elements in the set of business grid elements is greater than a first preset threshold, and determining a current set of business grid elements as the business distribution center grid cluster, wherein the business value of the business grid element is relevant to a number of MR sample points contained in the business grid element.

* * * * *